United States Patent [19]

Workman

[11] Patent Number: 4,539,937
[45] Date of Patent: Sep. 10, 1985

[54] CONTROLLED SHOCK ANIMAL TRAINING DEVICE

[76] Inventor: Edd Workman, Rte. 1, P.O. Box 253, Mineral Wells, Tex. 76067

[21] Appl. No.: 638,128

[22] Filed: Aug. 6, 1984

[51] Int. Cl.³ .................. H05C 1/04; A01K 15/02
[52] U.S. Cl. ................... 119/29; 231/2 E; 361/232
[58] Field of Search ............ 119/29, 106, 108, 130; 231/2 E; 54/71; 361/232; 273/84 ES

[56] References Cited

U.S. PATENT DOCUMENTS 2,940,425 6/1960 Dykens ..................... 119/130
3,608,524 9/1971 Waltz ....................... 231/2 E X
4,200,809 4/1980 Madsen ..................... 231/2 E X

FOREIGN PATENT DOCUMENTS 2939371 4/1981 Fed. Rep. of Germany ........ 119/29

Primary Examiner—Robert P. Swiatek
Attorney, Agent, or Firm—Charles D. Gunter, Jr.

[57] ABSTRACT

A controlled shock animal training device is shown which includes a mounting collar for mounting the device about a portion of the animal's body. The strap has a pair of electrical contacts which are spaced apart on the mounting strap. An electrical circuit, carried on the mounting strap, connects the pair of spaced electrical contacts and provides a controlled voltage output through the contacts upon triggering of an electrical switch within the circuit. A foldable flap formed in the collar interrupts the electrical circuit during installation of the collar. The shock provided is of limited duration and controlled intensity and requires that the electrical switch be opened and then reclosed to repeat the shocking operation.

5 Claims, 4 Drawing Figures

CONTROLLED SHOCK ANIMAL TRAINING DEVICE

BACKGROUND OF THE INVENTION

1. Field of the Invention

This invention relates to animal training devices and, specifically, to a training device which emits a controlled shock for discouraging undesirable habits in animals.

2. Background of the Invention

Shocking devices for various kinds are known for use in animal training. For instances, the so-called "hot shot" cattle prods are well known for use in maneuvering cattle. Dog collars are known for training hunting dogs by permitting them to follow a false trail, and, after a suitable interval of time, shocking them to deter them from following the wrong trail. Various electrical training devices are also known for weaning calves, training roping horses, and the like.

U.S. Pat. No. 3,687,112, to Henderson, issued Aug. 29, 1982, shows a device for breaking "cribbing" habits in horses. The device is provided on a strap which encircles the throat of the horse to hold electrical prods at opposite sides of the throat. A U-shaped former associated with the strap fits the strap to the windpipe of the horse. As the neck of the horse is swelled by cribbing, the force is applied to stretch the strap on a sensitive ribbon switch, which closes to complete an electric shocking circuit to shock the horse. While the Henderson device was an improvement over certain of the existing animal training devices, a primitive "vibrator" was used to generate the shocking current. The collar provided a six volt output which was too powerful for most horses. The device also features a rather insensitive thermistor which opened the shocking circuit in the case of an overload to interrupt the current flow. The thermal switch operated cumulatively as it heated in response to prolonged and protracted current stages to finally open and relieve the shock being applied to the animal.

There exists a need for an animal training device which provides a controlled voltage output to avoid harming sensitive animals such as racing horses and the like.

There exists a need for such a device which has a sensitive safety release to open the electrical circuit and avoid prolonged and protracted shocks to the animal.

SUMMARY OF THE INVENTION

A controlled shock animal training device is shown which includes a mounting strap for mounting the device about a portion of an animal'body. A pair of electrical contacts are spaced apart on the mounting strap. Circuit means carried on the mounting strap and connecting the pair of spaced electrical contacts provide a controlled voltage output through the contacts which is less than about two volts and lasts less than about 0.5 seconds in duration.

The circuit means preferably comprises a battery which is operably connected by means of a switch to a charging capacitor. The charging capacitor is connected on one side to a solid state oscillator for supplying a voltage to the oscillator and on another side to the primary winding of an induction coil. The output from the oscillator is fed to a transistor for turning the transistor on and then off. The transistor is operably connected to the primary winding whereby turning the transistor on builds up a flux field in the primary winding. Turning the transistor off causes the flux field to collapse, thereby developing an output voltage in a secondary winding of the induction coil for shocking an animal.

A safety flap can be formed in the collar in the region of a selected one of the pair of spaced electrical contacts. The flap is foldable between a safety position over the selected contacts to interrupt the circuit means and an operating position once the collar has been secured on the animal.

Additional objects, features and advantages will be apparent in the written description which follows.

DETAILED DESCRIPTION OF THE INVENTION

Figure 1:
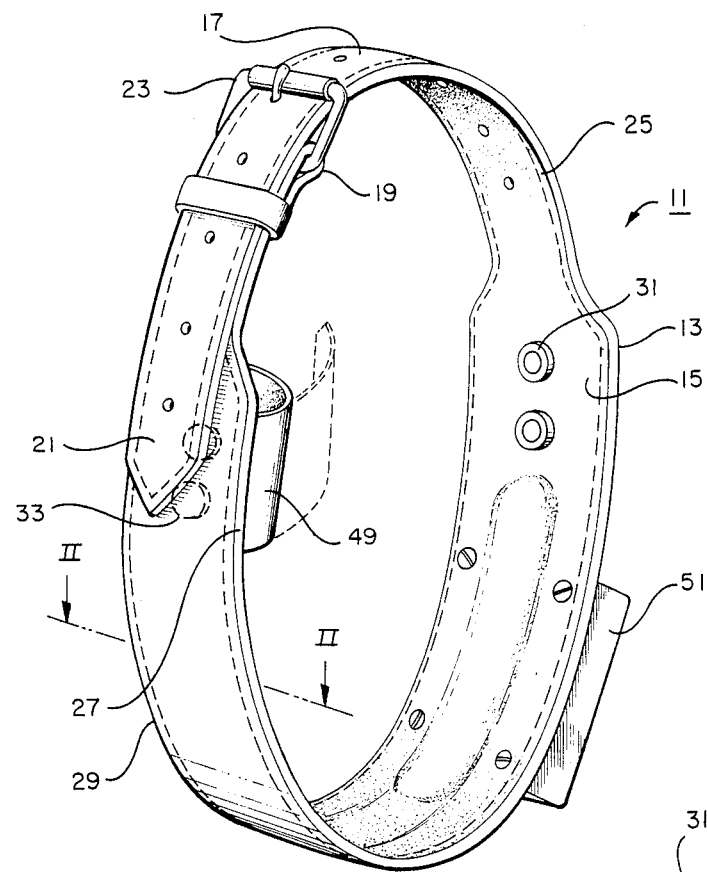
FIG. 1 is a perspective view of a controlled shock animal training device of the invention.
Figure 3:
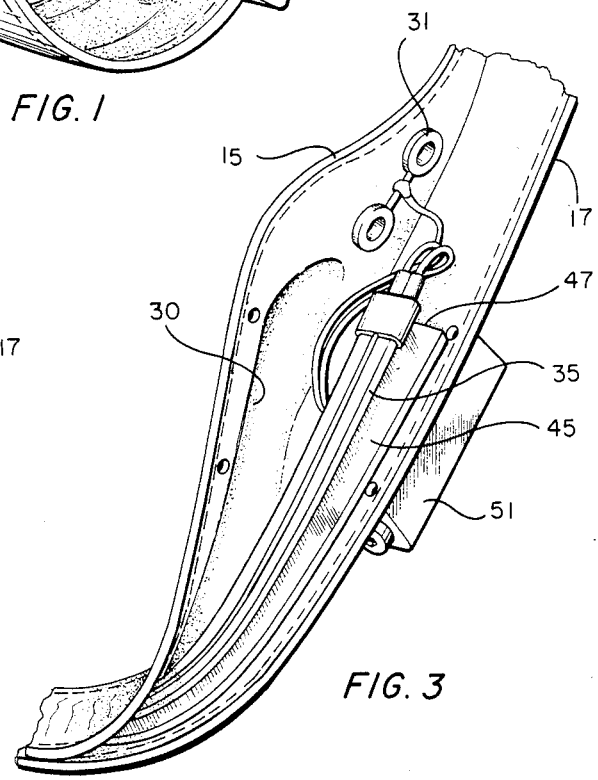
FIG. 3 is a partial, broken-away view of a portion of the animal training device of FIG. 1, showing the ribbon switch thereof.

FIG. 1 shows an animal training device of the invention designated generally as 11. The animal training device includes a mounting strap or collar 13 for mounting the device about a portion of an animal's body, such as the neck of the horse. As shown in FIGS. 1 and 3, the mounting collar 13 resembles a leather belt and has an inner surface 15, an outer surface 17, and terminating ends 19, 21, which are connectable by means of a buckle 23. The inner and outer surfaces 15, 17 are sewn together along seams 25 to form upper and lower edges 27, 29, respectively, and to form an interior pocket (30 in FIG. 3).

A pair of spaced electrical contacts 31, 33 are mounted on the collar 13 on opposite portions of the inner surface 15 when the collar 13 is in the position shown in FIG. 1. Although the contacts 33 are shown as dotted lines in FIG. 1, it will be understood that the contacts 33 are identical but oppositely disposed to contacts 31.

Figure 2:
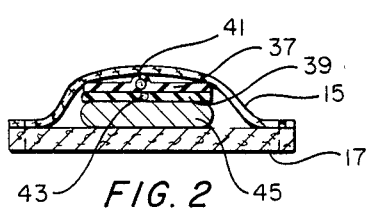
FIG. 2 is a cross-sectional view of the animal training device taken along lines II—II in FIG. 1.

As shown in FIG. 3, the electrical contacts 31, 33 are connected by a circuit means which is carried on the mounting collar for providing a controlled voltage output through the contacts and, hence, through the neck of the horse. The circuit means of the invention includes a sensitive ribbon switch 35 for actuating the electrical circuit. As shown in FIG. 2, the ribbon switch 35 comprises a pair of overlaying ribbons 37, 39, which carry electrical conductors 41, 43. When ribbons 37, 39 are pressed together, the circuit to the electrical contacts 31, 33 is closed. A suitable ribbon switch can be purchased from Allied Electronics, Inc. of Fort Worth, Tex., as tape switch 131A.

A gently curving metal strip 45 is carried against the ribbon switch 35 within pocket 30 formed between the inner and outer surfaces 15, 17 of the collar 13. As shown in FIG. 3, the ribbon switch 35 is positioned atop the metal strip 45 so that it is between the metal strip 45 and the horse's neck when the collar is in use. The pressure sensitive portion of the ribbon switch 35 terminates near each of the respective ends 47 of the metal strip 45 but does not extend beyond the respective ends 47 of the metal strip.

A safety flap 49 (FIG. 1) is formed in the collar 13 in the region of a selected one of the pair of spaced electrical contacts, in this case contacts 33. The flap 49 is foldable between a safety position, shown in solid lines, over the selected contacts 33 to interrupt the circuit means of the invention. The safety flap 49 can also be folded back into an operating position. This feature is useful when, for instance, the user is installing the collar about the neck of a horse. The flap can be folded to the position shown in FIG. 1 to avoid shocking the horse or trainer during installation of the collar.

Figure 4:
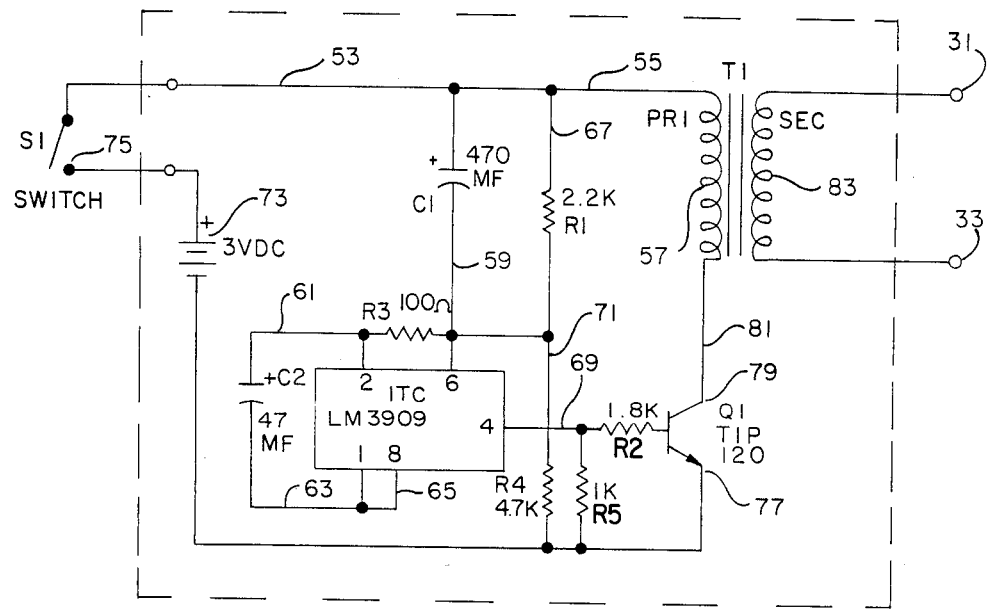
FIG. 4 is a schematic diagram of the electrical circuit of the animal training device of FIG. 1.

The remaining portions of the circuit means of the invention are housed within a plastic case (51 in FIG. 3) which is connected to the mounting collar 13 on the outer surface 17 thereof. The schematic of the circuit means of the invention is illustrated in FIG. 4. The switch S1 represents the ribbon switch 35, previously described, and is opened and closed by pressure on the collar caused when the neck muscles of the horse expand. The switch is connected by means of a line 53 to a 470 microfared capacitor C1 and through line 55 to the primary winding 57 of an transformer T1. The capacitor C1 is connected through a line 59 to pin 6 of an integrated circuit, LM 3909 which serves as an oscillator. Line 59 is also connected through a 100 OHM resistor R3 to pin No. 2 of the integrated circuit and through line 61 to a 47 microfared capacitor C2. Capacitor C2 is connected through a line 63 to pin No. 1 of the integrated circuit and by a line 65 to pin No. 8 of the integrated circuit. A 2.2K resistor R1 is present in the circuit in a line 67 parallel to capacitor C1. The output from the integrated circuit pin No. 4 passes through a line 69 to the junction of a 1.8K resistor R2 and 1K resistor R5. A 4.7K resistor R4 is present in a line 71 which joins line 67 containing resistor R1.

A three volt DC battery 73 is connected between the switch terminal 75 and the emitter 77 of a transistor Q1 (TIP120). The collector 79 of the transistor Q1 is connected by a line 81 to the primary winding 57. The base of transistor Q1 is connected to resistor R2.

The operation of the electrical circuit will now be described. When switch S1 closes, a voltage from the battery 73 is applied to the primary winding 57 of the transformer T1 and to the charging capacitor C1. The voltage is applied through the charging capacitor C1 to the integrated circuit, which functions as an oscillator to output pulses of a selected frequence to drive transistor Q1 repeatedly on and off. When transistor Q1 turns on, a flux field is built up in the primary winding 57 of the transformer T1. When transistor Q1 turns off, the flux field in primary winding 57 collapses and an output voltage is developed in the secondary winding 83 of the coil T1. The frequency of the integrated circuit is selected to be high enough to pass voltage across the transformer T1. The pulses on line 81 cause a voltage to be applied out to the collar through the electrical contacts 31, 33.

The integrated circuit will provide pulses only until capacitor C1 charges, at which time the output of the integrated circuit will cease. Charging capacitor C1 is selectively sized to charge quickly, preferably about 0.2 seconds, and, when charged, stops applying voltage to the integrated circuit so that no further high voltage output will be present between the electrical contacts 31, 33. It is necessary for the switch S1 to be opened and then reclosed before an additional voltage is output between the electrical contacts 31, 33. When switch S1 is closed, capacitor C1 will discharge. The circuit means of the invention thus applies a single, isolated shock to the animal each time the switch S1 is closed. To apply another shock, the switch S1 must be opened and then reclosed.

In operation, the collar is mounted about the neck of a horse with the rigid metal strip 45 positioned in the wind pipe region of the horse. If the neck muscles of the horse expand, as during cribbing, the ribbon switch 35 is compressed, thereby causing the switch S1 to close. As described, this action causes an output voltage to be developed between the electrical contacts 31, 33 which passes through the neck of the horse to produce a shock. The circuit described produces an output voltage of approximately 1.5 volts for a duration of approximately 0.2 seconds. The horse cannot be harmed by a prolonged shock, since it is necessary to open and then reclose the switch to repeat the operation.

An invention has been provided with several advantages. The training device of the invention provides a controlled voltage output through the electrical contacts of the collar which is sufficient for training purposes but which eliminates the possibility of prolonged and protracted current surges. The size and duration of the shock has been found to adequately train the animal without harming or unduly upsetting the animal. The safety flap provided on the collar provides a simple but effective mechanism for safely installing the collar about an animal's neck.

While the invention has been shown in only one of its forms, it is not thus limited but is susceptible to various changes and modifications without departing from the spirit thereof.

I claim:

1. A controlled shock animal training device, comprising:
    a mounting strap for mounting said device about a portion of an animal's body;
    a pair of electrical contacts spaced apart on said mounting strap; and
    circuit means carried on said mounting strap and connecting said pair of spaced electrical contacts, said circuit means including a pressure actuated ribbon switch for opening and closing a circuit between said spaced electrical contacts in response to movement of said animal's body, and said circuit means further comprising integrated circuit means for applying a single, isolated shock to said animal each time said ribbon switch opens and is then reclosed to thereby provide a controlled voltage output through said contacts, said output being less than about 2 volts and lasting less than about 0.5 seconds in duration.

2. A controlled shock animal training device, comprising:
    a mounting strap for mounting said device about a portion of an animal's body;
    a pair of electrical contacts spaced apart on said mounting strap;
    circuit means carried on said mounting strap and connecting said pair of spaced electrical contacts for providing a controlled voltage output through said contacts, said output being less than about 2 volts and lasting less than about 0.5 seconds in duration; and
    wherein said circuit means comprises a battery operably connected by means of a switch to a charging capacitor, said charging capacitor being connected on one side to a solid state oscillator for supplying a voltage to said oscillator, and on another side to the primary winding of an induction coil, the output from said oscillator being fed to a transistor for turning said transistor on and then off, and wherein said transistor is operably connected to said primary winding whereby turning said transistor on builds up a flux field in said primary winding and turning said transistor off causes said flux field to collapse, thereby developing an output voltage in a secondary winding of said induction coil for shocking an animal.

3. The controlled shock device of claim 2, wherein closing said switch completes an electrical circuit between said battery and charging capacitor, said capacitor being selectively sized to charge at a predetermined rate so that no further output voltage is present in said secondary winding until said switch is opened and then reclosed.

4. The controlled shock device of claim 3, wherein said charging capacitor is sized to provide a output voltage through said induction coil of approximately 1½ volts for approximately 0.2 seconds duration.

5. A controlled shock horse training device, comprising:
   a mounting collar having inner and outer surfaces and a connecting buckle for securing said device about the neck of a horse;
   a pair of electrical contacts spaced apart on opposite portions of said collar when said collar is in place on the neck of said horse;
   circuit means carried on said mounting collar connecting said pair of spaced electrical contacts for providing a controlled voltage output through said contacts, said output being less than about two volts and lasting less than about 0.5 seconds in duration, said circuit means including a battery operably connected by means of a ribbon switch to a charging capacitor, said charging capacitor being connected on one side to a solid state oscillator for supplying voltage to said oscillator, and on another side to the primary winding of an induction coil, the output from said oscillator being fed to a transistor for turning said transistor on and then off, and wherein said transistor is operably connected to said primary winding whereby turning said transistor on builds up a flux field in said primary winding and turning said transistor off causes said flux field to collapse, thereby developing an output voltage in a secondary winding of said induction coil for shocking said horse; and
   a safety flap formed in said collar in the region of a selected one of said pair of spaced electrical contacts, said flap being foldable between a safety position over said selected contact to interrupt said circuit means and an operating position.

* * * * *